(12) United States Patent
Lange

(10) Patent No.: US 7,001,055 B1
(45) Date of Patent: Feb. 21, 2006

(54) UNIFORM PUPIL ILLUMINATION FOR OPTICAL INSPECTION SYSTEMS

(75) Inventor: Steven R. Lange, Alamo, CA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 139 days.

(21) Appl. No.: 10/793,521

(22) Filed: Mar. 3, 2004

Related U.S. Application Data (60) Provisional application No. 60/540,851, filed on Jan. 30, 2004.

(51) Int. Cl.
*G02B 6/00* (2006.01)

(52) U.S. Cl. ............... 362/551; 362/253; 362/268; 356/237.2; 359/368

(58) Field of Classification Search ........ 362/551, 362/253, 268, 552; 353/67; 356/237.2; 359/368
See application file for complete search history.

(56) References Cited

U.S. PATENT DOCUMENTS 6,461,030 B1 * 10/2002 Shimokawa et al. ........ 362/551

* cited by examiner

*Primary Examiner*—Thomas M. Sember
*Assistant Examiner*—James W Cranson, Jr.
(74) *Attorney, Agent, or Firm*—Beyer Weaver & Thomas LLP (57) ABSTRACT

An illuminator for uniformly illuminating an entrance pupil of an inspection system in order to increase inspection resolution and sensitivity and improve system-to-system matching is described. The illuminator incorporates at least two lightpipes for spatially and angularly distributing light rays from the illuminator uniformly across the entrance pupil. The illuminator also results in spatial and angular uniformity at the field stop plane. In one embodiment, one lightpipe has a circular shape and a second lightpipe has a rectangular shape.

27 Claims, 3 Drawing Sheets

UNIFORM PUPIL ILLUMINATION FOR OPTICAL INSPECTION SYSTEMS

This application claims priority of U.S. provisional patent application No. 60/540,851, filed on Jan. 30, 2004, which is hereby incorporated by reference.

FIELD OF THE INVENTION

The present invention relates generally to optical inspection and review systems, and more specifically to illumination techniques for optical inspection and review systems.

BACKGROUND OF THE INVENTION

Inspection and review systems play an integral role in the semiconductor manufacturing industry. The primary role of inspection systems is to optimize the quality of manufacturing systems, which will minimize the number of semiconductor devices produced with defects thereby increasing yield. The performance requirements of inspection systems continue to increase as the size of semiconductor devices continues to decrease. For instance, the resolution and sensitivity requirements of inspection systems are becoming more stringent as they need to detect smaller sized defects in accordance with the smaller structures present on advanced semiconductor wafers. Another important consideration is the repeatability, or matching, of these inspection systems across multiple units, that is, it is important that one system sees exactly the same defects as another system on the same sample. These inspection systems can be used to inspect the semiconductor wafer at various stages of its fabrication and inspect lithography reticles also used in the fabrication processes.

Figures 1, 1A, 1B, 1C, 1D:
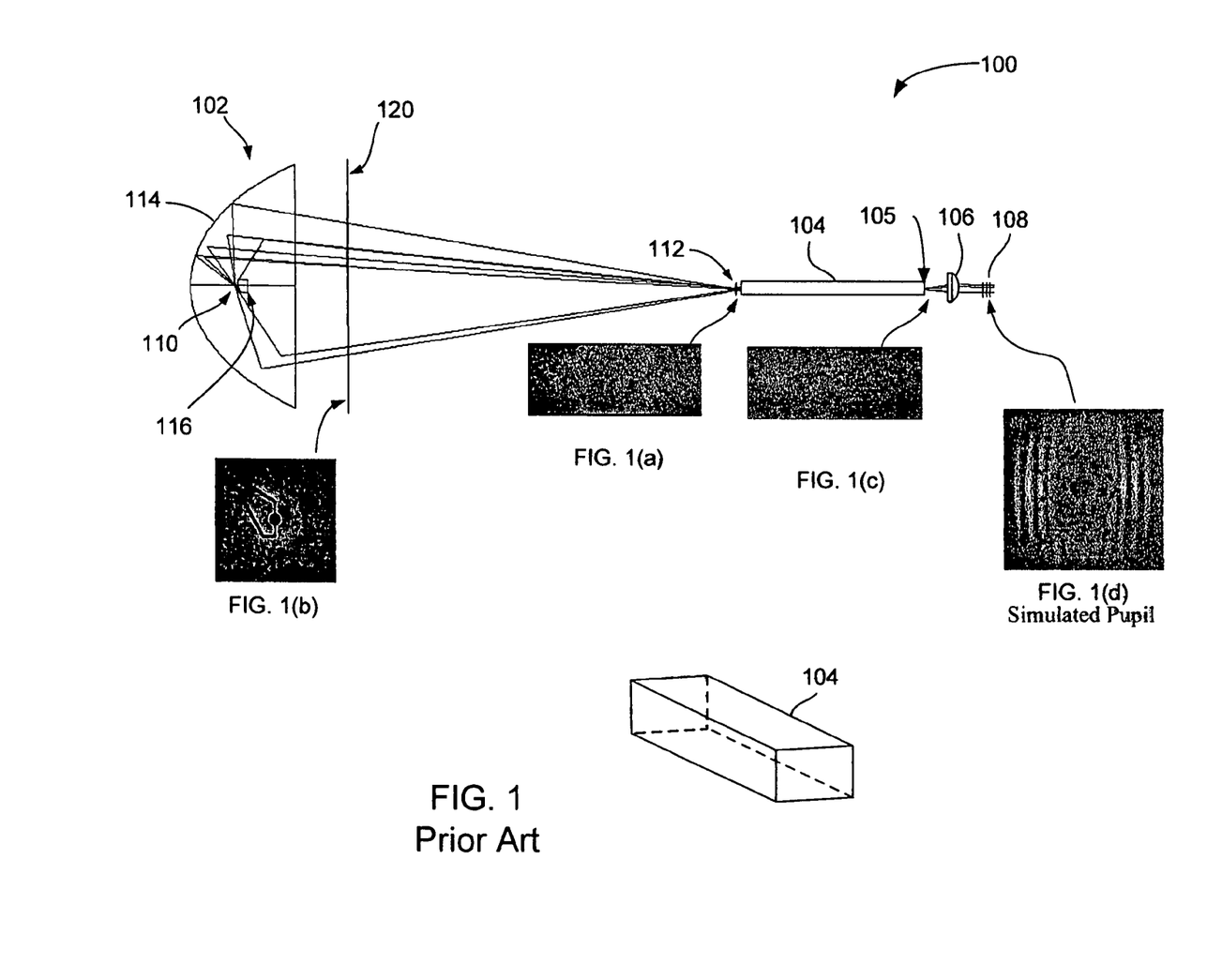
FIG. 1 illustrates a diagrammatic view of an illuminator for an arc lamp that can be used with common semiconductor wafer inspection tools.

The quality of light used for illumination with inspection systems is one factor affecting resolution, sensitivity, and matching. FIG. 1 shows a common illuminator 100 for an arc lamp source used in inspection systems. Ideally an illuminator produces a spatially uniform beam of light covering the full field of view as defined by the field stop of the inspection system at the sample under investigation. In addition, it should provide uniform angular illumination up to the full numerical aperture (NA) of the inspection system as defined by the entrance pupil. Any deviation from the uniform nature of the spatial and angular illumination will reduce the effectiveness of the inspection system through either less sensitivity or inability to match multiple inspection systems on the same specimen.

Illuminator 100 includes an illumination source 102, a rectangular lightpipe 104, optical lens 106, and an entrance pupil 108. FIG. 1 also illustrates a perspective view of rectangular lightpipe 104. Illumination source 102 causes light from source 110, which is located at one focal location of ellipsoidal reflector 114, to be collected at location 112, which is the second focal point for ellipsoidal reflector 114. Light at the exit of light pipe 104 will be conjugate to the field stop of the inspection system. Light pipe 104 is intended to make the light spatially uniform at the exit of light pipe 104. In one embodiment, illuminator 100 can use a microscopic-type illumination source for illumination on a brightfield semiconductor wafer inspection tool. Illuminator 100 illuminates an inspection field of view on a sample, such as a semiconductor wafer, by injecting light into an inspection system through entrance pupil 108.

Illumination source 102 typically includes an arc lamp 116 of Mercury (Hg) or Mercury Xenon (HgXe), which generates light in all directions. To effectively direct light towards second focal point 112 and lightpipe 104, an ellipsoidal reflector 114 is used to collect as much light as possible and reflect the light from arc lamp 116. Unfortunately, various factors cause light emanating from illumination source 102 to be non-uniform in nature when the light reaches entrance pupil 108. Non-uniform illumination light at entrance pupil 108 causes deterioration of inspection system resolution since the resolution of an inspection tool is a function of the Fourier transform of the light distribution at entrance pupil 108 along with the phase of the lenses aberrations. So a non-uniform pupil 108, especially one with an illumination falloff towards the edges of pupil 108, will reduce resolution. Another factor affecting sensitivity is the amount of light available throughout entrance pupil 108. This can be important when applying illumination aperture techniques which use light blocks in the pupil to provide only certain illumination angles at the wafer. These techniques can increase sensitivity of certain classes of defects on wafer samples. If there is not much light near the edge of the pupil, then illumination apertures which use light from the edge of the pupil will be less effective. Generally, non-uniform light causes a sample to be unevenly illuminated and thereby results in inspection signals having non-uniform sensitivity and will not match between inspection systems.

One of the factors affecting the uniformity of the illumination light is the inherent quality of the plasma within arc lamps. The plasma causes the light that leaves the lamps to have different intensities at different angles. Another factor is the non-uniformities of the reflective surface of ellipsoidal reflector 114 and any aberrations the surface might have from the ideal ellipsoidal surface. Yet another major factor is the large range of incident angles (from very low to very high) through which light from arc lamp 116 reflect off of ellipsoidal reflector 114. The reflectivity of the coatings on the ellipsoidal reflector will change as a function of incidence angle.

The light can be non-uniform in respect to spatial distribution and angular distribution. FIG. 1(a) illustrates a computer simulation of the distribution of light from illumination source 102 at a plane located at second focal point 112. This location also happens to be at the point before light enters lightpipe 104. FIG. 1(a) shows that the light is spatially non-uniform since it varies with respect to the radial distance from the center of the circle of light.

Another factor causing non-uniform light distribution at entrance pupil 108 is that the arc lamp 116 generates light between an anode and a cathode. These very anodes, cathodes, and the wires that connect to these respective components block portions of the light generated from arc lamp 116. Inset FIG. 1(b) illustrates a computer simulation of the distribution of light from illumination source 102 at the plane 120. FIG. 1(b) shows that the light intensity varies with respect to the radial distance from the center of the circle of light. More notably however, FIG. 1(b) shows the shadow created by the anode, cathode, and wires that are connected each respective component.

Rectangular lightpipe 104 is used to compensate for the non-uniform spatial nature of the light from illumination source 102. Lightpipes scramble the light from the arc lamp 116 as the light bounces through lightpipe 104 as it travels through its length. Specifically, rectangular shaped lightpipes are used to scramble the spatial distribution of the light so that light is uniformly distributed in the plane of the field stop 105. FIG. 1(c) illustrates a computer simulation of the distribution of light from illumination source 102 after the light has been spatially distributed by passing through lightpipe 104 at field stop conjugate 105. As shown in FIG. 1(c), the light is substantially more evenly distributed in the spatial respect when compared to FIG. 1(a). After passing through lightpipe 104, the light is directed by optical lenses 106 towards entrance pupil 108. In one embodiment, lightpipe 104 has a 4.3 mm×1.72 mm rectangular outline while having a pipe length of approximately 150 mm.

Even though the non-uniform nature of the light from illumination source 102 is reduced with respect to spatial distribution at the field stop 105, the light remains non-uniform with respect to angular distribution, which is represented by the spatial distribution of light at the entrance pupil 108 after imaging by lens 106. The location of lens 106 is one focal length of lens 106 away from field stop conjugate 105 and the pupil is formed at about 1 focal length further down the optical axis from lens 106. Used in this manner, lens 106 changes the angular distribution of light at field stop conjugate 105 to spatial light distribution at entrance pupil 108. Thus, any non-uniformity of the angular distribution of light leaving field stop 105 will result in a non-uniform spatial distribution of light at entrance pupil 108. Rectangular lightpipe 104 does not re-distribute the angles at which light travels because the angles at which the light bounces off the internal surfaces of the rectangular lightpipe 104 are preserved. FIG. 1(d) illustrates a computer simulation of the distribution of light from illumination source 102 at entrance pupil 108. Unfortunately, it can be seen in FIG. 1(d) that the light at entrance pupil 108 is highly spatially non-uniform and this will result in non-uniform illumination angles at the specimen. The distribution of light at the pupil can adversely affect the system's resolution and its sensitivity to defect capture. In addition, the matching of one system to another system is dependent upon the same non-uniform illumination being achieved in each system's entrance pupil. Since this non-uniformity is a result of many factors already mentioned, it is difficult to achieve this requirement. In particular, the wires going to the arc lamp produce obscurations depending upon their shape and routing that are multiply distributed throughout entrance pupil 108 through the kaleidoscope effect from lightpipe 104.

Other types of illuminators use lens-type condensers instead of ellipsoidal mirrors to collect and direct light in into a lightpipe. These condensers also suffer from angular non-uniformities, which result in entrance pupil non-uniformities due to lens aberrations, anti-reflection differences as a function of incidence angle and the obscurations from cathode and anode and their connection wiring.

One attempt others have used to smooth out the light at entrance pupil 108 to increase system resolution and sensitivity involves using a diffuser. Generally, a diffuser is a rotating grounded glass plate or phase glass plate capable of reducing the artifacts from the arc lamp and its structures (anode, cathode and wires). However, it is difficult to achieve a uniform pupil with a diffuser as it tends to produce a Guassian distribution of light leaving it. Also, diffusers are generally not very light efficient, need to be rotated at high velocity (e.g., 10,000 to 20,000 rpm), and can be expensive.

Other illumination sources for wafer inspection and review systems include a laser source. The laser usually has a Gaussian distribution of light leaving it and methods of producing an angular and spatial uniform illumination at the specimen include both light pipes and diffusers of various types. In all cases, these suffer from the inability to remove the basic Gaussian distribution of the laser at either the entrance pupil or field stop.

In light of the foregoing, there are continuing efforts to provide improved techniques for distributing light uniformly across an entrance pupil of an inspection system while maintaining the uniform distribution across the field stop.

BRIEF SUMMARY OF THE INVENTION

The present invention is directed to an illuminator for uniformly illuminating an entrance pupil and a field stop of an inspection system in order to increase inspection resolution and sensitivity, and make tool-to-tool matching achievable. The illuminator incorporates at least two lightpipes for spatially and angularly distributing light rays from the light source uniformly across the entrance pupil.

One aspect of the invention pertains to an illuminator that includes an illumination source that emits light rays, a first lightpipe suitable for receiving the light rays from the illumination source and channeling the light rays wherein the spatial distribution of the light rays become randomized as the light rays travel through the first lightpipe, a field stop conjugate at the exit of the first lightpipe where light is spatially uniform, a second lightpipe for receiving the light rays as the light rays exit the first lightpipe, the second lightpipe being suitable for channeling the light rays wherein the spatial distribution of the light rays become randomized as the light rays travel through the second lightpipe, and a system pupil located at an end of the second lightpipe where the light rays exit the second lightpipe wherein the light rays are substantially uniformly distributed across the system pupil and the angle of the light rays are substantially uniformly distributed across a range of incident angles.

An alternative embodiment of an illuminator of the present invention includes an illumination source that emits light rays, a substantially circular lightpipe suitable for receiving the light rays from the illumination source and channeling the light rays wherein the spatial distribution of the light rays become randomized as the light rays travel through the circular lightpipe, a field stop conjugate at the exit of the first lightpipe where light is spatially uniform, a substantially rectangular lightpipe for receiving the light rays as the light rays exit the circular lightpipe, the rectangular lightpipe being suitable for channeling the light rays wherein the spatial distribution of the light rays become randomized as the light rays travel through the rectangular lightpipe, and a system pupil located at an end of the rectangular lightpipe where the light rays exit the rectangular lightpipe, wherein the light rays are substantially uniformly distributed across the system pupil and the angle of the light rays are substantially uniformly distributed across a range of incident angles.

These and other features and advantages of the present invention will be presented in more detail in the following specification of the invention and the accompanying figures, which illustrate by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention will now be described in detail with reference to a few preferred embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known operations have not been described in detail so not to unnecessarily obscure the present invention.

The present invention pertains to an illuminator for uniformly illuminating both an entrance pupil and a field stop of an inspection system in order to increase inspection resolution and sensitivity and to provide tool-to-tool matching. The illuminator incorporates at least two lightpipes for spatially distributing light rays from the illuminator uniformly across the entrance pupil and spatially distributing light rays from the illuminator uniformly across the field stop. Spatial uniformity is characterized when the plane has substantially equal density of light rays throughout the plane. Angular uniformity is characterized when each of the light rays within a plane have incident angles that are uniformly distributed throughout a range of incident angles up to and including the maximum numerical aperture of the objective lens for the inspection system. For example, such a range of incident angles can be between zero and sixty-four degrees (numerical aperture=0.90). The illuminator thus provides both spatial uniformity of light at the specimen covering the field of view of the inspection system and angular uniformity of light at the specimen covering the numerical aperture of the inspection system.

Figure 2:
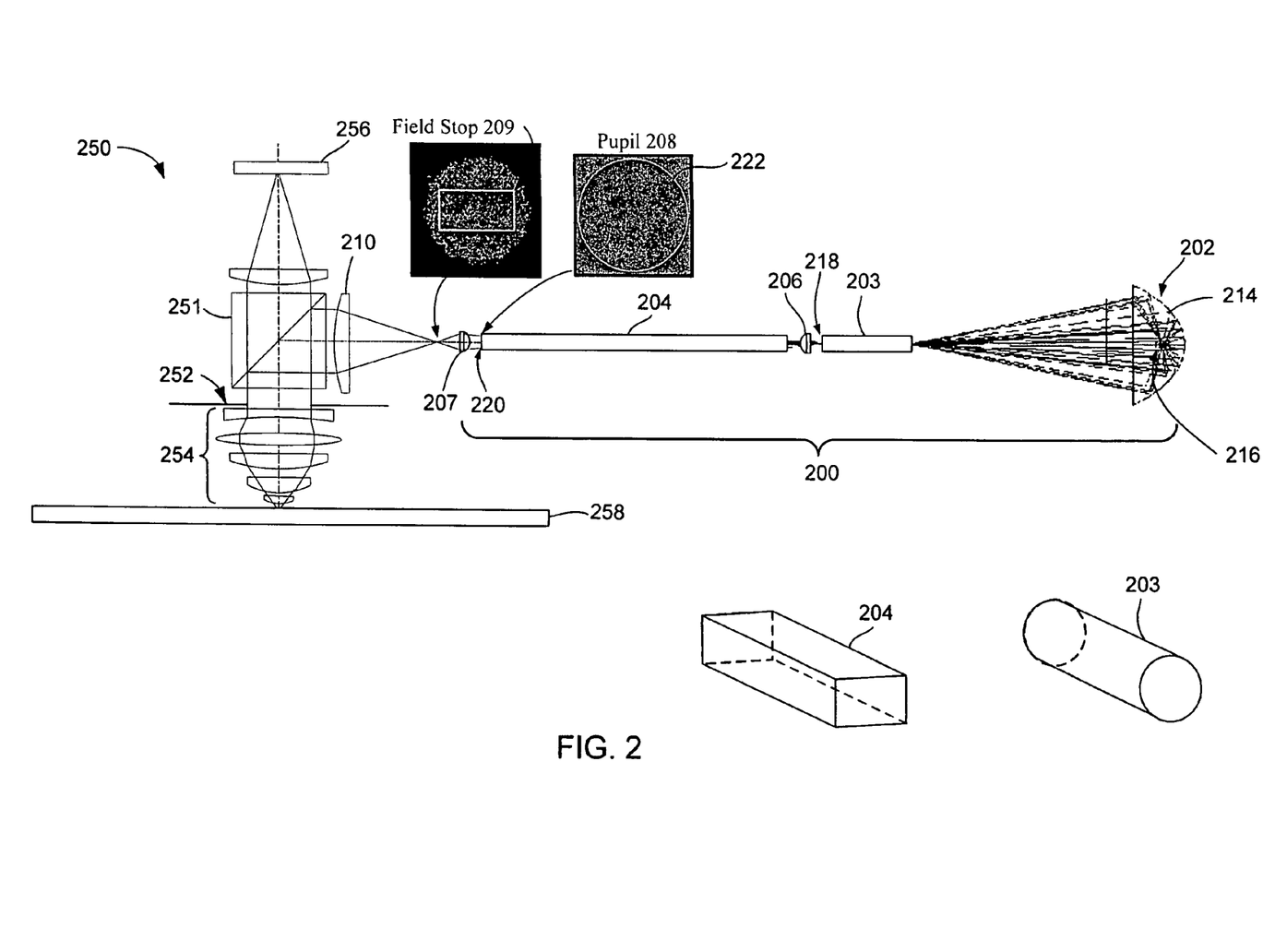
FIG. 2 illustrates a diagrammatic view of an illuminator that is used together with an optical inspection system according to one embodiment of the present invention.

FIG. 2 illustrates a diagrammatic view of an illuminator 200 that is used together with an optical inspection system 250 according to one embodiment of the present invention. Illuminator 200 includes an illumination source 202, a circular lightpipe 203, a rectangular lightpipe 204, a first optical lens 206, a second optical lens 207, an illuminator pupil 208, and a field stop 209, and a third optical lens 210. FIG. 2 also illustrates a perspective view of an isolated circular lightpipe 203 and an isolated rectangular lightpipe 204. In one embodiment, illuminator 200 can use a microscopic-type illumination source to illuminate a brightfield or darkfield semiconductor wafer inspection tool. Illuminator 200 illuminates an inspection field of view on a specimen, such as a semiconductor wafer or lithography recticle, by injecting light into inspection system 250 through illuminator pupil 208. Inspection system 250 includes a beam splitter 251, an objective lens 254, the objective lens pupil 252, and one or more detectors 256. Lenses 207 and 210 form a pupil relay to image the illuminator pupil 208 onto inspection system objective lens pupil 252 at the proper magnification to fill the aperture of the objective pupil 252. Inspection system 250 is directed at a sample 258, which can be a semiconductor wafer or lithography reticle. Beam splitter 251 reflects light from illuminator 200 towards objective lens 254. Objective lens 254 focuses the light rays from illuminator 200 upon sample 258. At least some of the light rays reflect, scatter or diffract off of sample 258 and are collected by objective lens 254 and are directed through beam splitter 251. The light rays are then detected by detectors 256.

Illumination source 202 typically includes an arc lamp 216 of Mercury (Hg) or Mercury Xenon (HgXe), which generates light in all directions. An ellipsoidal reflector 214 is used to collect and reflect the light from arc lamp 216 and direct it towards circular lightpipe 203. As the light passes through circular lightpipe 203, the light internally reflects off of the cylindrically shaped surface of lightpipe 203 such that the distribution of the light at the exit of lightpipe 203 is spatially uniform and will be optically conjugate to the field stop of the illuminator. In other words, the light rays within a plane at the exit end 218 of lightpipe 203 have equal density. Proximate to the exit end 218 of circular lightpipe 203 is positioned first optical lens 206, which directs light from circular lightpipe 203 into rectangular lightpipe 204. The distance between the exit of lightpipe 218 and lens 206 is approximately one focal length of lens 106. The distance between lens 206 and the entrance to lightpipe 204 is also approximately one focal length of lens 206. As the light passes through rectangular lightpipe 204, the light totally internally reflects off of the rectangular shaped surface such that the spatial distribution of the light rays become more uniform at its exit 220. Illuminator pupil 208 is formed at the exit end 220 of rectangular lightpipe 204. Second optical lens 207 directs light that exits from rectangular lightpipe 204 through a field stop 209 and with lens 210 reimages the illuminator pupil 208 onto the inspection system's objective lens pupil 252. The magnification between the illuminator pupil 208 and the objective lens pupil 252 can vary with the system design and one skilled in the art can easily configure the focal lengths and magnifications of these two lenses to accomplish the needed pupil relay. Then the light from illuminator 200 enters inspection system 250.

In one embodiment, illuminator pupil 208 has an aperture 222 in the shape of a circle created at or near the exit end 220 of rectangular pipe 204. For example, aperture 222 can be created in a mask that is placed at or near the exit end 220 of rectangular pipe 204. Aperture 222 causes light exiting from lightpipe 204 to have a circular shape matching the shape of inspection system objective lens pupil 252. Field stop 209 is designed to be just slightly larger than the conjugate image of the wafer at detector 256 as magnified by the intermediate lens systems. The field stop 209 is slightly larger to allow for alignment tolerances between it and detector 256. Field stop 209 can be rectangular shaped with aspect ratios of 2:1. Such an aspect ratio matches a detector having a 2048×1024 array of square pixel elements. One familiar in the field can design the appropriate sizes for the field stop, aperture stop and intermediate optics.

Each of the circular and rectangular light pipes 203 and 204, respectively, spatially distributes light uniformly within illuminator. However, the combination of circular and rectangular lightpipes 203 and 204, respectively, allows illuminator 200 to have light that is uniformly distributed in the angular and spatial respects at illuminator pupil 208 and field stop 209. In alternative embodiments of the invention, the shape, size, and position of each of lightpipes 203 and 204 can be adjusted and changed while still achieving illumination spatial and angular uniformity. For instance, lightpipe 203, which is located proximate to light source 202, can be a variety of shapes and sizes. Also, lightpipe 204, which is on the opposite end of lightpipe 203 from light source 202, can also be a variety of shapes and sizes. In one specific embodiment, lightpipes 203 and 204 can be rectangular and circular in shape, respectively. The aspect ratio of each lightpipe will also vary in order to achieve a desired level of spatial and angular distribution at illuminator pupil 208. Typically, each light pipe should have approximately the same aspect ratio, which is the length to the width at the end of the pipe, to get the desired uniformity at both the entrance pupil and the field stop. Additionally, in some embodiments, a combination of more than two different types of lightpipes can be used to achieve illumination uniformity.

In the system shown in FIG. 2, lightpipes 203 and 204 distribute the light rays to be spatially and angularly randomized across pupil 208 and field stop 209. Pupil 208 is located at the end of lightpipe 204 where the light rays exit lightpipe 204 and field stop 209 is located on the opposite side of optical lens set 207 from lightpipe 204. Lightpipe 203 acts as the field stop randomizer by randomizing the light rays across field stop 209 and lightpipe 204 acts as the pupil randomizer by randomizing the light rays across pupil 208.

In an alternative embodiment, a different layout of optical lenses can be configured so that the positions of pupil 208 and field stop 209 are altered relative to the lightpipes. For example, the positions of pupil 208 and field stop 209 can be switched so that the field stop opposite end of optical lens set 207 from lightpipe 204. In this embodiment, lightpipe 203 would act as the pupil randomizer by randomizing the light rays across the pupil and lightpipe 204 would act as the field stop randomizer by randomizing the light rays across the field stop.

In some embodiments of the invention, an aspect ratio of 100:1 for each lightpipe allows the lightpipes to effectively distribute the light rays in the spatial and angular respects. For circular lightpipes, this refers to a ratio of the length of the pipe against the diameter of the circular opening. And for rectangular lightpipes, the aspect ratio refers to the length of the pipe compared against the length of one side of the rectangular opening or the length of a diagonal axis across the opening. The aspect ratio of a square shaped lightpipe is the length of the lightpipe divided by the length of one side of the square shaped opening of the lightpipe.

A lightpipe is commonly a solid glass rod through which light rays can travel by total internal reflectance. Alternatively, the lightpipes are tubular passageways having an inner reflective surface. Lightpipes can have various cross-sectional shapes, such as circular, rectangular or square. Rectangular light pipes can be formed from four mirrors placed inwards to create a rectangular passageway.

The size of lightpipe 204 relates to the size of illuminator pupil 208 and its conjugate relationship with inspection system objective pupil 252. In general, light needs to be distributed to sufficiently cover an area slightly larger than the image of pupil 252 at illuminator pupil 208 to ensure sufficient light supply to inspection system 250. The length of lightpipes 203 and 204 can have relatively shorter lengths when the light rays from light source 202 have high incident angles because the light rays will have a higher number of reflections per length of each pipe 203 and 204. In this situation, the light rays will become more quickly distributed in the spatial respect.

In one embodiment, circular lightpipe 203 has a diameter of 2.3 mm and a length of 150 mm, and rectangular lightpipe 204 has a square opening having 10 mm sides and a length of 1000 mm. In some embodiments, rectangular lightpipe 204 can also have a length of 500 mm depending upon the degree of uniformity needed at the pupil and field stops.

The combination of lightpipes can be useful in spatially and angularly distributing the light from various types of light sources. For example, illumination source can also be of the filament type, arc lamps, lasers, gas discharge lamps, plasmas, or flash lamps.

Lightpipes are commonly formed of materials that are highly transmissive of light. For example, lightpipes of the present invention can be formed of optical glass, fused silica, calcium fluoride, as well as other transmissive materials. Lightpipes formed of optical glass are well suited for illumination sources that produce light in the visible range of the light spectrum. Lightpipes formed of fused silica are well suited for illumination sources that produce light in the ultraviolet range of the light spectrum. Lightpipes formed of calcium fluoride are well suited for illumination sources that produce light in the ultra-deep ultraviolet range of the light spectrum.

Minimizing light loss is an important factor in inspection tools. The circular shape of lightpipe 203 is advantageous as a minimal amount of light is lost from light source 202 when it is imaged onto its front face. However, light loss in illuminator 200 can occur at multiple locations. The first location of possible light loss is at the exit of rectangular lightpipe 204 where a circular aperture 222 is used for illuminator pupil 208 which will be inscribed into a rectangular exit 204. Allowing for a slight oversizing of the lightpipe exit 204 compared with the circular aperture 222, a loss of approximately 30% of the light occurs at this location.

The second location light loss occurs at field stop 209 where a rectangular TDI format is inscribed into a circular light distribution. The circular shape of lightpipe 203 causes light at field stop 209 to have a circular shape. However, the usable light at the field stop 209 is in a rectangular shape with aspect ratio corresponding to the aspect ratio of the TDI detector used to inspect a sample under inspection. Its size should be slightly larger than the image size of the TDI at this field stop location through the intermediate optics. The light loss at this location is a function of the aspect ratio of the detector 256 compared with a circle and can be 50% in most cases. Inevitably, light that falls outside of the TDI format is lost as well. In some embodiments, the combined light efficiency is approximately 36%. Light loss from the standard illuminators is not much better as significant light can be lost at the entrance of the rectangular shaped lightpipe 104 because of the circular image of the arc at that location and again at the pupil 108 where more overfill is needed to attempt to keep the central usable part of the aperture uniform.

Figure 3:
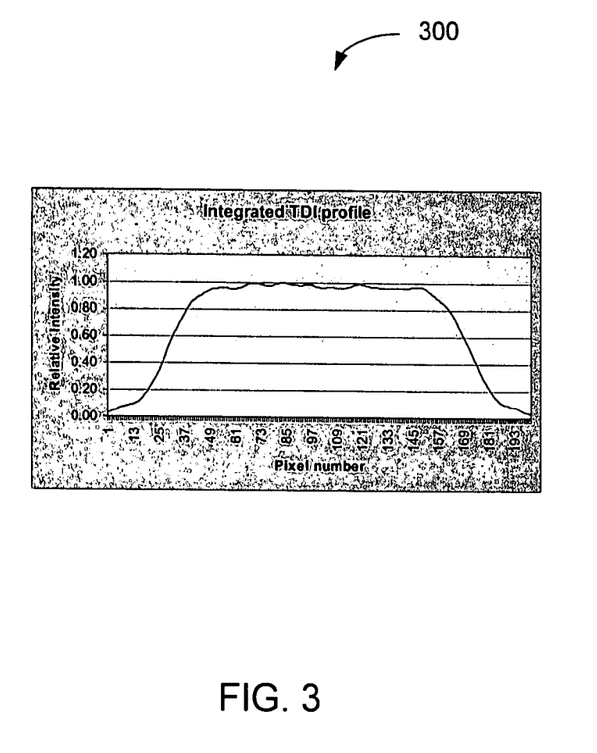
FIG. 3 illustrates a graph of the intensity of light across the field of view of an inspection system detector.

FIG. 3 is presented to describe the improved uniformity of light from illumination source 200. FIG. 3 illustrates a graph 300 of the integrated intensity of light across the field of view as imaged by an inspection system detector. The graph shows the light collected by a detector using time delayed integration (TDI). The x-axis represents the pixel position along a detector and the y-axis represents the relative intensity of the light collected by the detector at each of the pixel positions. FIG. 3 shows how the illuminator of the present invention improves the uniformity of light distribution across a field of view. In one respect, the intensity of light is relatively constant across the full field of view. Additionally, the intensity of light rapidly falls off just beyond the edges of the field of view. A highly ideal distribution of light would maximize the span of uniform light distribution across a field of view.

Figure 4:
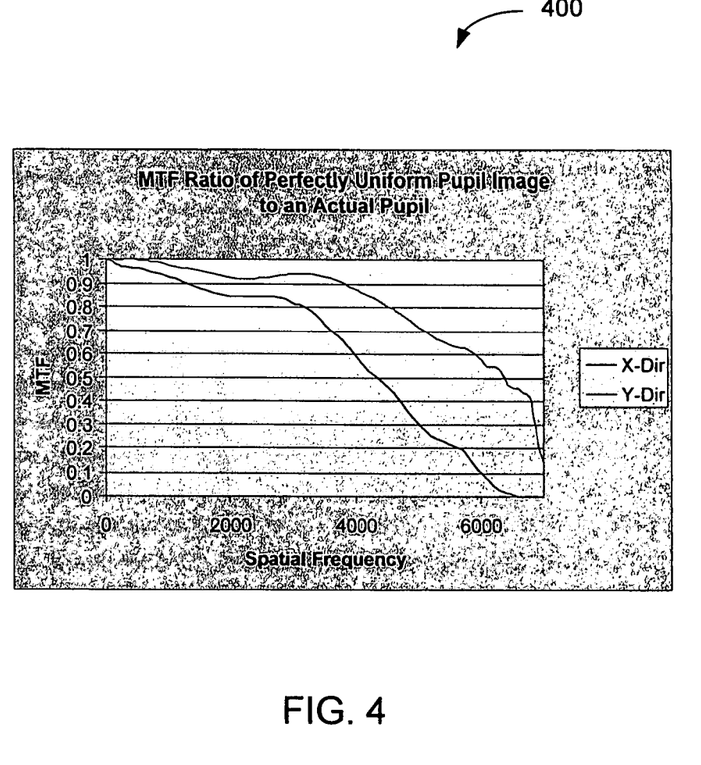
FIG. 4 illustrates a graph that shows a modulation transfer function (MTF) for an optical inspection system using an illuminator of the present invention in each of the x and y axial directions.

FIG. 4 illustrates a graph 400 that shows a modulation transfer function (MTF) ratio for an optical inspection system using an illuminator of the present invention in each of the x and y pupil directions. The x-axis in the graph represents spatial frequency and the y-axis in the graph represents the ratio of the MTF of a perfectly uniform pupil to the MTF from an actual measured pupil using a standard illuminator for each of the spatial frequencies. Spatial frequency can be measured in cycles per millimeter. The MTF curve compares the contrast of light entering an inspection system versus the contrast of light exiting the inspection system as a function of the spatial frequency of the light pattern being imaged. The y-axis represents system contrast where 1.0 represents high contrast and 0.0 represents no contrast situations. The higher the imaged contrast the more resolution and hence higher sensitivity the inspection system will have.

Two factors affecting the MTF curve include the phase of the light at the pupil and the pupil transmission. Pupil transmission refers to the uniformity of light at the pupil. Light having less uniformly causes the MTF curve to be lower indicating reduced contrast in the image. MTF curves that remain high in value represent an optical system that will have more contrast in the image. The lightpipe combination of the present invention allows the MTF curve to improve in the higher spatial frequency range. This corresponds to inspection systems being able to obtain higher resolution of small defects. In some embodiments, the improvement in contrast at higher spatial frequencies can be on the order of 50% improvement, which can have significant impact on sensitivity as well.

Uniform spatial light distribution at the field stop ensures that all of a specimen is illuminated over the field of view, thereby ensuring that all of defects are equally illuminated wherever they might land in the field of view. In this manner, if the specimen is loaded into an inspection system with a slightly different location, the inspection system will obtain the same signal from the defect insuring repeatability. Angular uniformity ensures that a sample is illuminated with light rays having a full range of incident angles within the numerical aperture of the objective lens system, which increases the chances of receiving a signal from each of the different types of defects. Even marginal increases in signal intensity can improve inspection system defect capture rates since the increase in signal intensity can overcome certain noise levels accompanying a sample under inspection.

A factor affecting the sensitivity of an inspection system is where the light comes from in illumination space. In other words, the elevation and azimuth angle of illumination light from the pupil that becomes incident on the structure is important in the amount of signal that is produced from a defect relative to its surroundings. Sensitivity can be dramatically affected if light in the pupil were not present corresponding to these needed angles. In many cases, inspection systems use apertures in the system pupil to limit the directions of light onto the specimen which will maximize the defect signal relative to the background. An inspection system having a uniformly illuminated pupil will have more light present passing through each of these apertures compared with a non-uniformly illuminated pupil. Therefore, a uniform pupil will allow for increase sensitivity through its ability to maximize light through selective pupil aperture shapes.

Another embodiment includes a laser source where two lightpipes can be utilized to overcome the Gaussian laser beam profile to produce both uniform pupil and field stop illumination. This can be used in addition to a spatial coherence busting technique, for example a rotating ground glass plate or rotating phase plate or any other techniques familiar to one skilled in the art.

While this invention has been described in terms of several preferred embodiments, there are alteration, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

We claim:

1. An illuminator for providing illumination in an inspection system comprising:
   an illumination source that emits light rays;
   a first lightpipe suitable for receiving the light rays from the illumination source and channeling the light rays wherein the spatial distribution of the light rays become randomized as the light rays travel through the first lightpipe;
   a second lightpipe for receiving the light rays as the light rays exit the first lightpipe, the second lightpipe being suitable for channeling the light rays wherein the spatial distribution of the light rays become randomized as the light rays travel through the second lightpipe; and
   wherein the light rays are substantially spatially uniformly distributed across a pupil and the angle of the light rays are substantially uniformly distributed across a range of incident angles at the pupil.

2. An illuminator as recited in claim 1 wherein the pupil or an image of the pupil is located at an end of the second lightpipe where the light rays exit the second lightpipe.

3. An illuminator as recited in claim 2 further comprising a field stop, wherein the light rays that exit the second light pipe pass through the field stop such that the light rays are substantially spatially uniformly distributed across the pupil and the angle of the light rays are substantially uniformly distributed across a range of incident angles at the field stop.

4. An illuminator as recited in claim 1 further comprising an optical lens set positioned at an opposite end of the second light pipe from the end of the second lightpipe that is adjacent to the first light pipe, and wherein the pupil is located on an opposite side of the optical lens set from the second lightpipe.

5. An illuminator as recited in claim 4 wherein a field stop is located at the end of the second light pipe that is opposite from the end of the second lightpipe that is adjacent to the first light pipe and wherein the light rays that pass through the field stop are substantially spatially uniformly distributed across the pupil and the angle of the light rays are substantially uniformly distributed across a range of incident angles at the field stop.

6. An illuminator as recited in claim 1 wherein the first lightpipe has a substantially circular shape.

7. An illuminator as recited in claim 6 wherein the second lightpipe has a substantially rectangular or square shape.

8. An illuminator as recited in claim 7 further comprising:
   a mask placed at the pupil or image of the pupil, the mask having an aperture shape corresponding to the aperture shape of the inspection system.

9. An illuminator as recited in claim 7 wherein the first and the second lightpipes have an aspect ratio of approximately 100:1.

10. An illuminator as recited in claim 7 wherein the rectangular lightpipe is longer than the circular lightpipe.

11. An illuminator as recited in claim 10 wherein the rectangular lightpipe has a length of approximately 1000 mm and a square shaped opening that is 10 mm in length on each side, and the circular lightpipe has a length of approximately 150 mm and a diameter of 2.3 mm.

12. An illuminator as recited in claim 1 wherein the first lightpipe has a substantially rectangular or square shape and the second lightpipe has a substantially circular shape.

13. An illuminator as recited in claim 1 further comprising:
   a first optical lens set positioned between the first lightpipe and the second lightpipe suitable for directing the light rays from the first lightpipe into the second lightpipe.

14. An illuminator as recited in claim 1 wherein the illuminator source is a plasma arc lamp having a volume source and an elliptical reflective surface.

15. An illuminator as recited in claim 1 wherein the illuminator source is a plasma arc lamp having a volume source and a lens condenser.

16. An illuminator as recited in claim 1 wherein the illuminator sources is a laser and is used with a diffuser for busting spatial coherence.

17. An illuminator as recited in claim 1 wherein the illuminator source is a filament type light source, a laser, a gas discharge lamp, or a flash lamp.

18. An illuminator as recited in claim 1 wherein each lightpipe is formed of a refractive material such as optical glass, fused silica, or calcium fluoride.

19. An illuminator as recited in claim 1 wherein each lightpipe is formed of a substantially circular or rectangular passageway having an inner reflective surface.

20. An illuminator as recited in claim 1 wherein the inspection system further comprises:
   a sample that is desired to be inspected;
   a beam splitter that reflects and transmits light from the illuminator;
   an objective lens set that focuses the light rays upon the sample such that the light rays reflect off of the sample;
   at least one detector for receiving at least some of the light rays that reflect off of the sample.

21. An illuminator for providing illumination in an inspection system comprising:
   an illumination source that emits light rays;
   a substantially circular lightpipe suitable for receiving the light rays from the illumination source and channeling the light rays wherein the spatial distribution of the light rays become randomized as the light rays travel through the circular lightpipe;
   a substantially rectangular lightpipe for receiving the light rays as the light rays exit the circular lightpipe, the rectangular lightpipe being suitable for channeling the light rays wherein the spatial distribution of the light rays become randomized as the light rays travel through the rectangular lightpipe; and
   a pupil or image of a pupil located at an end of the rectangular lightpipe where the light rays exit the rectangular lightpipe, wherein the light rays are substantially uniformly spatially distributed across the pupil and the angle of the light rays are substantially uniformly distributed across a range of incident angles at the pupil.

22. An illuminator as recited in claim 21 further comprising a field stop, wherein the light rays that exit the rectangular light pipe pass through the field stop such that the light rays are substantially spatially uniformly distributed across the field stop and the angle of the light rays are substantially uniformly distributed across a range of incident angles at the field stop.

23. An illuminator as recited in claim 21 further comprising:
   a mask placed at the pupil or image of the pupil, the mask having an aperture shape corresponding to the aperture shape of the inspection system.

24. An illuminator as recited in claim 22 wherein the first and the second lightpipes have an aspect ratio of approximately 100:1.

25. An illuminator as recited in claim 22 wherein the rectangular lightpipe is longer than the circular lightpipe.

26. An illuminator as recited in claim 22 further comprising:
   a first optical lens set positioned between the first lightpipe and the second lightpipe suitable for directing the light rays from the first lightpipe into the second lightpipe.

27. An illuminator as recited in claim 26 further comprising:
   a second optical lens set positioned at an opposite end of the second lightpipe from the end of the second lightpipe that is positioned near the first optical lens set, wherein the second optical lens set directs the light rays into the field stop.

* * * * *

UNITED STATES PATENT AND TRADEMARK OFFICE
CERTIFICATE OF CORRECTION

PATENT NO. : 7,001,055 B1
APPLICATION NO. : 10/793521
DATED : February 21, 2006
INVENTOR(S) : Steven R. Lange It is certified that error appears in the above-identified patent and that said Letters Patent is hereby corrected as shown below:

Column 7, line 25, add --would be located at the exit end of the lightpipe 204 and the pupil would be located on the-- after "field stop".

Signed and Sealed this

Nineteenth Day of September, 2006

JON W. DUDAS
*Director of the United States Patent and Trademark Office*